United States Patent [11] 3,603,722

[72] Inventor Olin L. Graham
Houston, Tex.
[21] Appl. No. 50,206
[22] Filed June 26, 1970
[45] Patented Sept. 7, 1971
[73] Assignee The United States of America as represented by the Administrator of the National Aeronautics and Space Administration

[54] COLOR TELEVISION SYSTEM
11 Claims, 6 Drawing Figs.

[52] U.S. Cl. .......... 178/5.2 R, 178/5.4, 178/6.7
[51] Int. Cl. .......... H04n 9/02, H04n 9/06, H04n 9/34
[50] Field of Search .......... 178/5.2, 5.4, 5.4 RC, 5.4 SY, 69.5 TV

[56] References Cited
UNITED STATES PATENTS 2,435,963 2/1948 Goldmark .......... 178/5.4 RC
2,878,309 3/1959 Christensen .......... 178/5.4 RC

*Primary Examiner*—Richard Murray
*Attorneys*—Marvin J. Marnock, Marvin F. Matthews and John R. Manning

ABSTRACT: A spring-driven optical filter wheel is rotatably mounted in front of the lens of a monochrome television camera. The wheel includes red, green and blue filter sectors and an opaque sector, the latter producing a completely black frame in the resulting video signal. The picture-reproducing apparatus located at the receiving station includes a monochrome television monitor having a second optical filter wheel rotatably mounted in front of the picture tube thereof. A counter counts the vertical sync pulses in the received video signal and advances this second filter wheel at the same rate as are occurring the completely single color frames in the video signal. A black frame detector detects the occurrence of a black frame and synchronizes the counter. A gate circuit is controlled by the counter to pass only completely single color video frames to the picture tube. A color film camera exposes a given segment of color film to the individual red, green and blue images following a given black frame to record a full color image on such segment.

INVENTOR.
Olin L. Graham
BY
M. J. Marmock
ATTORNEY

INVENTOR.
Olin L. Graham
BY

ATTORNEY

INVENTOR.
Olin L. Graham
BY

ATTORNEY

COLOR TELEVISION SYSTEM

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to a color television system for enabling a monochrome television camera to provide color pictures.

In certain applications, it would be very desirable to have a small, lightweight television camera capable of generating color image signals. Typical of these applications are the cases where the camera is to be used aboard a spacecraft or an orbiting satellite or on the surface of an extra-terrestrial body such as the moon or another planet. Existing types of color television cameras, however, tend to be more cumbersome and complex than is desired. A substantial saving in size and complexity could be realized if a monochrome television camera could be modified in a relatively simple manner to accomplish this purpose.

In such applications, it would also be desirable to have a small, lightweight television camera which could readily be changed back and forth to generate either color image signals or black and white image signals. Again, a present day color camera could be modified to accomplish this purpose but, again, the apparatus would be more cumbersome and complex than is desired.

In the present invention, these purposes are accomplished by providing a color television system wherein a small and inexpensive color filter mechanism is used with a monochrome television camera to produce the desired color picture signals. In one embodiment, such filter mechanism takes the form of a color wheel having optical filters of different colors in the different sectors thereof. In one manner of use, the color filter mechanism is merely slipped over the barrel of the monochrome camera lens whenever it is desired to transmit color information. In such case, the filter mechanism is a self-contained unit requiring no electrical connections with the camera circuits.

It is known to use a rotating color wheel in front of the lens of a monochrome television camera for enabling such camera to produce color television signals in a field sequential manner. In the known systems, the color wheel is driven by an electric motor, the operation of which is carefully synchronized with the vertical scanning action in the television camera. In this manner, there is produced a video signal having successive red, green and blue frames representing the red, green and blue components of the scene being televised. At the receiver, a similar color wheel is rotated in front of a black and white or monochrome picture tube and the rotation of such wheel is carefully synchronized with the vertical scanning action in the receiver.

These known color wheel systems provide camera equipment which is more cumbersome and complex than is desired for the compact, lightweight applications being considered. The synchronous motors used in such equipment are relatively bulky. They consume an appreciable amount of electrical power. The additional synchronizing circuits required in the camera increase the complexity thereof. The fact that the color wheel should be placed in an optical focal plane, in order to reduce color impurity at the top and bottom edges of the picture, complicates the camera lens system. Also, the color wheel and its driving mechanism cannot be used with existing monochrome television cameras without modifying such cameras to enable the necessary electrical interconnections.

SUMMARY OF THE INVENTION

It is an object of the invention, therefore, to provide a new and improved color television system wherein color images can be obtained with a monochrome television camera by employing therewith a small relatively inexpensive color filter mechanism.

It is another object of the invention to provide a new and improved color television system wherein color images can be obtained with a monochrome television camera by employing therewith a color filter mechanism which requires no electrical power, has no electrical connection with the camera circuits and is not synchronized with the operation of the camera circuits.

It is a further object of the invention to provide a new and improved small, self-contained color filter mechanism which may be readily slipped onto the lens barrel of an existing monochrome television camera when it is desired to transmit color image signals.

In accordance with one feature of the invention, there is provided a color television system which utilizes at the broadcasting location a monochrome television camera for viewing a scene and generating a television signal corresponding thereto. The camera equipment also includes optical filter means comprising at least three sectors, two of which have different color transmission characteristics and the third of which is opaque. The camera equipment further includes means for mounting the optical filter means in front of the lens of the television camera whereby the various sectors may move, one at a time, in front of such lens. The camera equipment additionally includes spring means for driving the optical filter means for causing such movement.

In accordance with another feature of the invention, there is provided a color television system wherein the picture reproducing apparatus at the receiving location includes color image-reproducing means responsive to the received video signal for producing images in different colors. The picture reproducing apparatus further includes means responsive to the received video signal for detecting the occurrences of the black video signal frames which are produced when the opaque sector is before the camera lens and controlling the color image-reproducing means for causing the first color video frame to produce an image in such first color and for causing the second color video frame to produce an image in such second color.

For a better understanding of the present invention, together with other and further objects and features thereof, reference is had to the following description taken in connection with the accompanying drawings, the scope of the invention being pointed in the appended claims.

BRIEF DESCRIPTION OF THE DRAWINGS

Referring to the drawings.

DESCRIPTION OF THE PREFERRED EMBODIMENTS

Figures 1, 2, 3, 6:
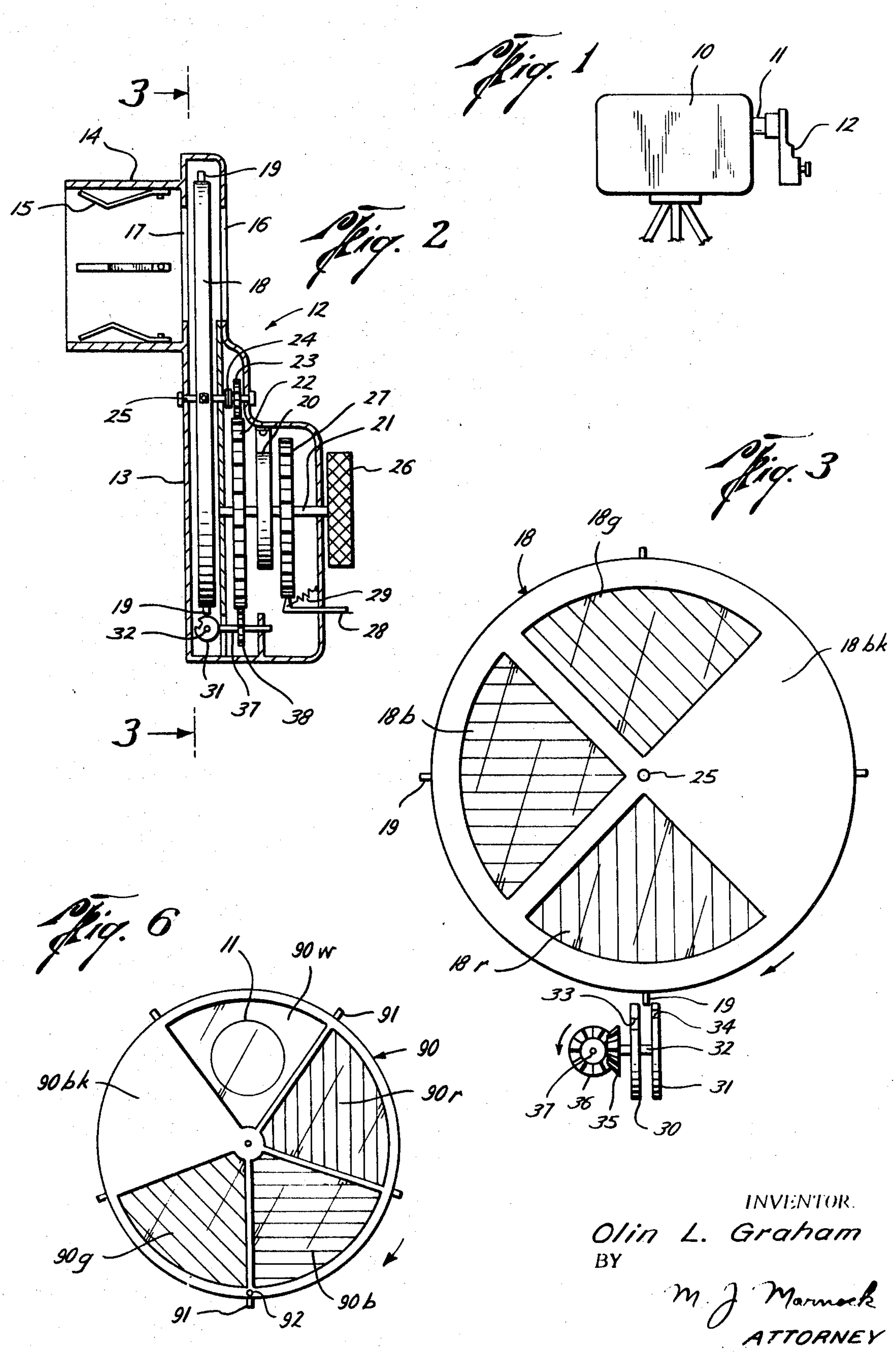
FIG. 1 is a general view of the television camera equipment used at the broadcasting location.
FIG. 2 is an enlarged cross-sectional view of the color filter mechanism of FIG. 1.
FIG. 3 is an enlarged view taken along section line 3—3 of FIG. 2.
FIG. 6 shows a modified form of color filter wheel for use with the television camera.

Referring to FIG. 1, there is shown a monochrome television camera 10 for viewing a scene and generating a television video signal representing the black and white or monochrome content of such scene. For sake of an example, it will be assumed that the television system being considered corresponds to the system used by the National Aeronautics and Space Administration in their Apollo lunar exploration program. Such system is a slow scan, noninterlaced television system having a frame rate of 0.625 frames per second. Thus, the camera 10 requires 1.6 seconds to generate each complete picture frame segment of the video signal. Mounted on the lens barrel 11 of the camera 10 is a color filter mechanism 12 for enabling the camera 10 to generate color representative signals in a frame sequential manner.

The details of the color filter mechanism 12 are shown in the enlarged cross-sectional views of FIG. 2 and 3. The color filter mechanism or apparatus 12 includes a housing 13 having an open-ended tubular projection 14 which is adapted to slide over the camera lens barrel 11. Spring clips 15 hold the unit firmly in place on the lens barrel 11. Transparent windows 16 and 17 are provided in the front and backwalls of the housing 13 in line with the tubular projection 14.

Rotatably mounted within the housing 13 is an optical filter wheel 18 which, as indicated as in FIG. 3, includes four 90° sectors, designated as 18*r*, 18*g*, 18*b* and 18*bk*. Sectors 18*r*, 18*g* and 18*b* are formed by optical color filters respectively having red, green and blue color transmission characteristics. Sector 18*bk* is an opaque sector for producing a video signal frame corresponding to a black image. The wheel 18 is provided with four index tabs or detents 19 which extend radially at 90° points around the periphery of the wheel 18.

The optical filter wheel 18 is driven by a coil spring 20 (FIG. 2) which is coupled thereto by way of shaft 21, gears 22 and 23, friction clutch 24 and the center axle 25 of the wheel 18. One end of the spring 20 is attached to the shaft 21 and the other end is attached to the housing 13. A windup key 26 is mounted on the shaft 21 for winding the spring 20. Also mounted on the shaft 21 is a circular ratchet wheel 27 which cooperates with a pawl release mechanism 28 for preventing unwinding of the spring 20 until the desired time. By pushing the release mechanism 28 inwardly, the ratchet 27 is freed to rotate. A small spring 29 serves to return the release mechanism 28 to its ratchet locking position when the pushing force is removed from release mechanism 28.

The spring drive system further includes an escapement mechanism for causing the filter wheel 18 to rotate in a stepwise manner. This escapement mechanism includes a pair of circular stop plates 30 and 31 (FIG. 3) mounted on a common shaft 32. Plates 30 and 31 are respectively provided with detent passage slots 33 and 34, such slots being offset or located at slightly different angular positions about the shaft 32. Bevel gears 35 and 36 couple the shaft 32 to a further shaft 37 which extends toward the front of the housing 13. A spur gear 38 is mounted on the shaft 37 and the teeth thereof mesh with the teeth of the large spur gear 22. This escapement mechanism is constructed so that each sector of the filter wheel 18 will remain stationary in front of the camera lens for a length of time approximately equal to three times the vertical scanning period in the camera 10.

Considering briefly the operation of the color filter apparatus 12, the coil spring 20 is wound and operation is commenced by pushing the release mechanism 28 inwardly. The consequent unwinding of the spring 20 causes rotation of the large spur gear 22 which, in turn, causes rotation of the stop plates 30 and 31 of the escapement mechanism. For the greater part of the time, the filter wheel 18 is held stationary because of the fact that one of the detents 19 is trapped between the stop plates 30 and 31. During such time, the friction clutch 24 allows the necessary slippage so that the large spur gear 22 can continue to rotate. When the slot 33 on stop plate 30 moves into alignment with the detent 19 resting thereagainst, such detent moves through the slot 33 and the filter wheel 18 rapidly rotates through an angle of 90°. The next detent 19 then hits against the right side of stop plate 31 to terminate the rotation. Shortly thereafter, this next detent 19 moves through the slot 34 and is thereafter held between the stop plates 30 and 31 until the first slot 33 again reappears. When a detent 19 is released by the stop plate 30, the rotary motion of the large spur gear 22 is transferred to the filter wheel 18 by the friction clutch 24.

Each of the sectors 18*r*, 18*g*, 18*b* and 18*bk* is held stationary in front of the camera lens for a length of time approximately equal to three times the vertical scanning period or frame period in the camera 10. For the case of a 0.625 frames per second scanning rate, this means that each sector of the wheel 18 will remain before the camera lens for approximately 4.8 seconds before the wheel 18 is again rotated through an angle of 90°. Thus, for this assumed rate, the stop plates 30 and 31 should rotate at a speed such that a complete revolution thereof requires 4.8 seconds. Among other things, this timing is provided by proper selection of the gear ratio between spur gears 22 and 38. A timing accuracy of ±1 percent is adequate for the assumed case. The timing accuracy requirement can be reduced to ±12 percent by modifying the timing so that each filter wheel sector remains before the camera lens for a period equal to four times the camera frame period.

For the case of a wireless communications link, the video signal generated by the camera 10 is transmitted to a desired receiving station by means of appropriate radio frequency transmitter equipment. At the receiving station, appropriate radio frequency receiving equipment operates to process the received signal and to recover therefrom the video signal component previously generated by the camera 10. This recovered video signal may cathode-ray supplied directly to the picture-reproducing apparatus or it may, instead, be recorded on magnetic tape by appropriate tape recording equipment. In the latter case, the tape is played back at a later time and the video signal supplied to the picture reproducing apparatus at that time. If desired, the video signal can also be supplied to the picture-reproducing apparatus at the same time that it is being tape recorded.

Figure 4:
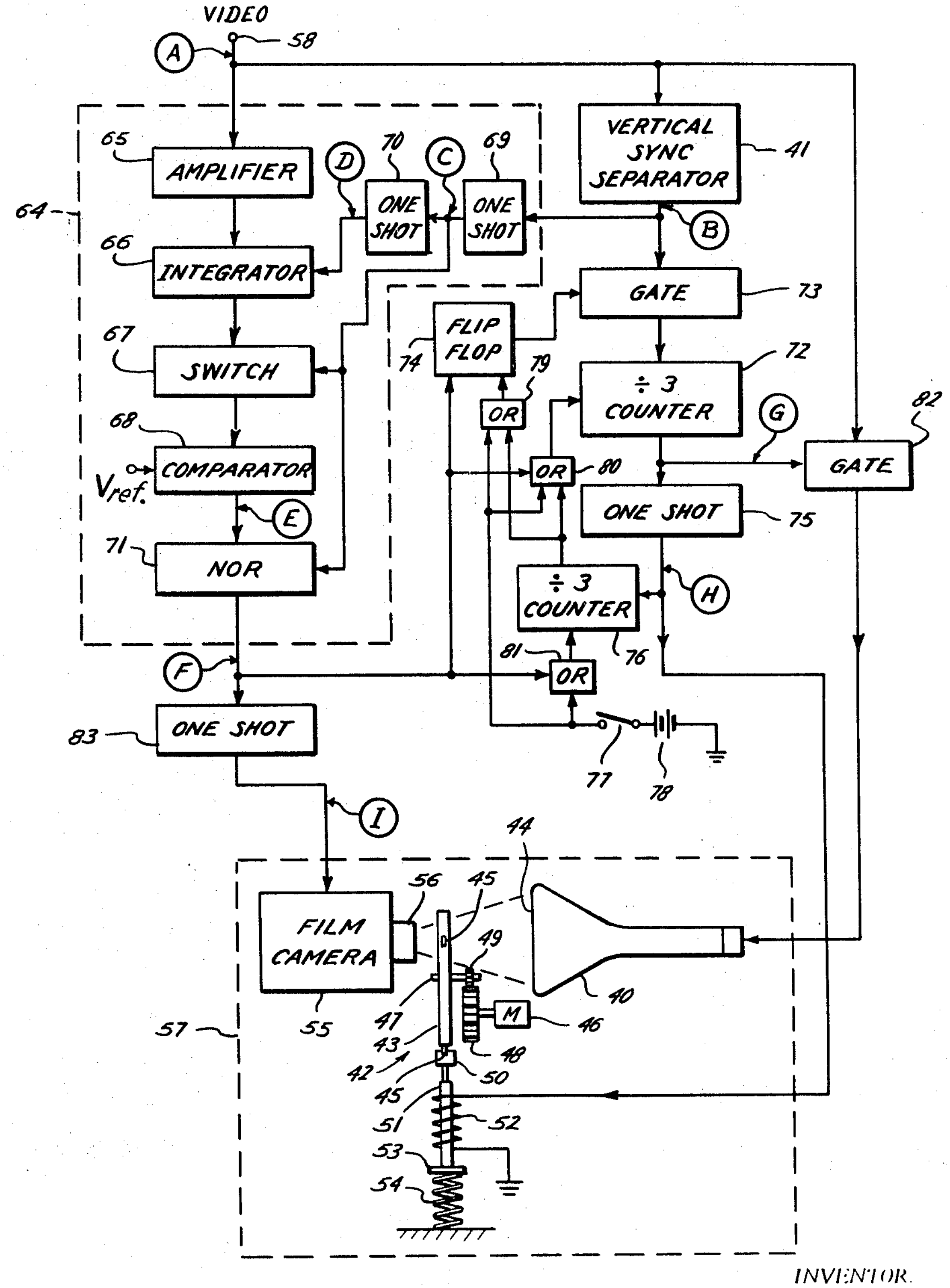
FIG. 4 shows in a schematic manner one form of picture-reproducing apparatus for reconstructing the transmitted color pictures.

Referring now to FIG. 4, there are shown the presently significant portions of one form of picture-reproducing apparatus for recreating the color images of the scene or scenes originally televised. Such apparatus is a modified form of a conventional monochrome television monitor. For sake of simplicity, the conventional parts of the monitor which need not be considered in order to understand the present invention are omitted from the drawing. For point of reference, a monochrome cathode-ray tube 40 represents the picture tube of the monitor and a vertical sync separator 41 represents the correspondingly designated part of such monitor.

With this in mind, the picture-reproducing apparatus of FIG. 4 includes color image-reproducing means capable of responding to a television video signal and capable of producing images in different colors. In the present embodiment, this color image-reproducing means is comprised of the monochrome cathode-ray tube 40 and a color filter mechanism 42 having an optical filter wheel 43 rotatably mounted in front of the display screen 44 of the tube 40. Filter wheel 43 is provided with three 120° sectors respectively having red, green and blue color transmission characteristics. In the present embodiment, no opaque sector is required in the filter wheel 43. Three radially extending detents 45 are located at 120° points around the periphery of the wheel 43. These detents 45 are located at the boundary lines between the different color sectors.

The color filter mechanism 42 further includes color control means for causing advancement of the optical filter sectors of the wheel 43 past the display screen 44 at a rate corresponding to the rate of occurrence of the completely single-color frames in the incoming video signal. This color control means includes a motor 46, the shaft of which is coupled to the center axle 47 of the filter wheel 43 by means of spur gears 48 and 49. Motor 46 may be of any suitable type, provided that it has the capability of not overheating when the filter wheel 43 is being held stationary.

The color control means further includes a controllable escapement or detent stopping mechanism for engaging an appropriate one of the detents 45 when the wheel 43 is to be held stationary. This detent stopping mechanism includes a stop plate 50 which is connected to the actuator or plunger 51 of a solenoid 52. The opposite end of the solenoid plunger 51 is connected to a plate 53 which is spring biased in an upwardly direction (toward the wheel 43) by a coil spring 54. When no electrical current is being supplied to the solenoid coil 52, spring 54 urges the stop plate 50 upwardly and into the path traversed by the detents 45. This holds the color wheel 43 stationary. When current is supplied to the solenoid coil 52, this pulls the plunger 51 and the stop plate 50 downwardly so as to release the lowermost one of the detents 45. This enables the wheel 43 to rotate. In use, the current is in the form of a short pulse so that stop plate 50 is quickly returned to its upwardmost position so as to catch the next detent 45 and thus to limit the rotation to an angle of 120°.

A color film camera 55 is located on the opposite side of the filter wheel 43 such that the lens 56 thereof views the images on the display screen 44 through the uppermost one of the filter sectors on the wheel 43. Film camera 55 is loaded with a roll of color-sensitive photographic film. Film camera 55 includes a film-advancing mechanism which may be pulsed with electrical pulses to advance the film from one picture frame to the next. In use, the shutter of the film camera 55 is set in an open position and the optical portion of the image-reproducing and filming system is enclosed by an appropriate lightproof enclosure 57.

Figure 5:
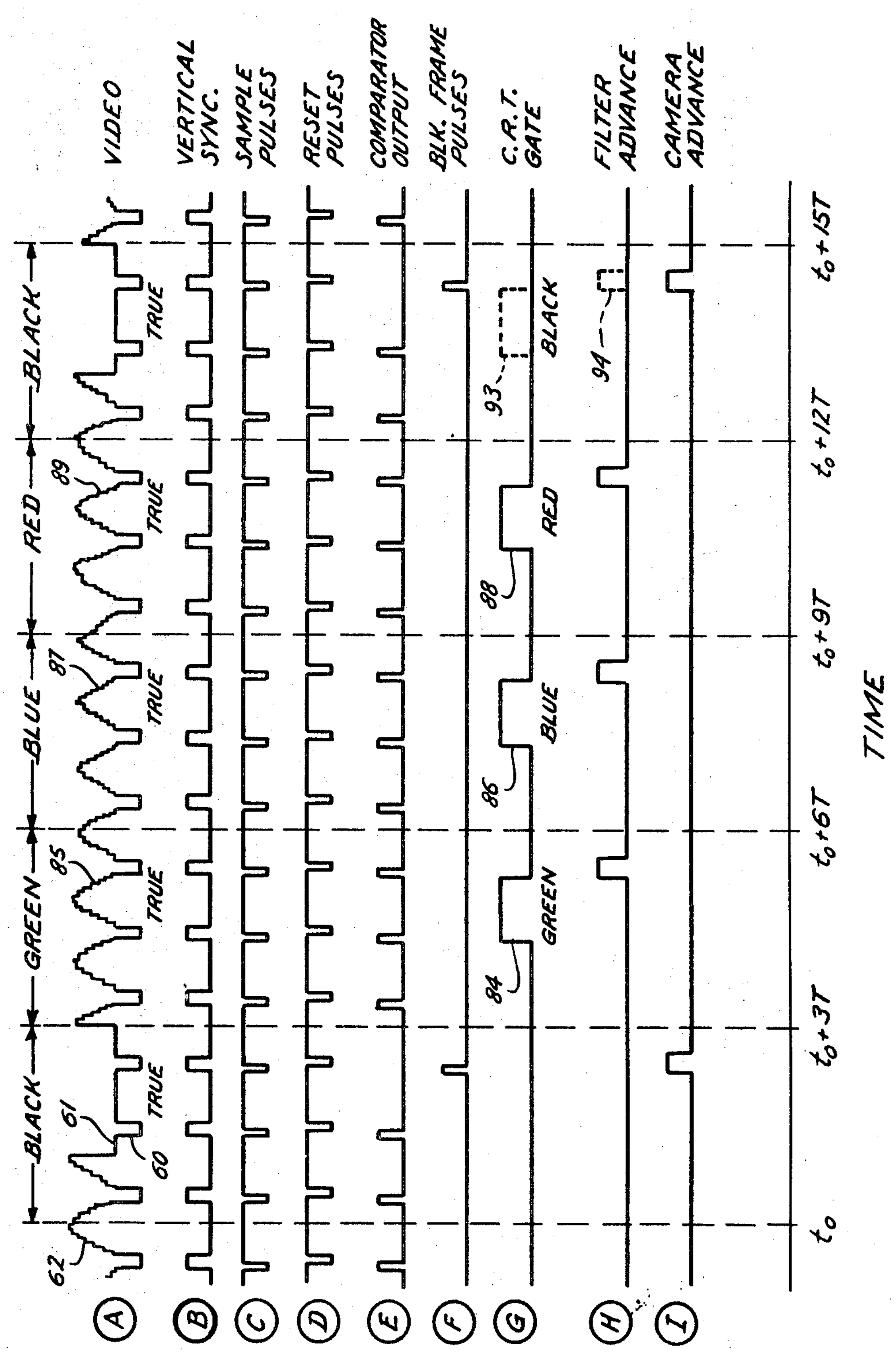
FIG. 5 is a timing diagram showing the electrical signal waveforms which are present at different points in the FIG. 4 apparatus.

The received video signal (or the tape playback thereof) is supplied by way of a terminal 58 to the input of the vertical sync separator 41. The waveform of a typical length of the video signal which is produced when filter mechanism 12 is operating is represented by waveform A of FIG. 5. For sake of an example, it is assumed that the television camera filter wheel 18 is switched from one sector to the next at times $t_o$, $_o$+3T, $t_o$+6T, etc., where T denotes the length of the frame interval or vertical scanning interval in the television camera. Time $t_o$ is purely arbitrary and may be placed at any point in the video waveform. It is further assumed that the sector sequence is: black (opaque), green, blue, red. The vertical sync pulse component of the composite video signal is represented by pulses 60 extending downwardly from the signal black level 61, while the image information component of the signal is represented by the upwardly extending fluctuations 62 located above the black level 61. For simplicity, the horizontal sync pulse component is not shown.

In order to fully understand the operation of the system, it is important to bear in mind the storage characteristics of the image pickup tube or camera tube used in the camera 10. In particular, each point on the photosensitive mosaic located in the camera tube stores all the light information reaching such point until such time as such point is again scanned by the scanning beam in the camera tube. In effect, the scanning beam erases the light information previously stored at such point so that immediately thereafter the point can store the information for a new color all by itself. Thus, following switching of filter sectors, there is a one-frame time lag before pure single-color information representing the new color will begin to appear in the video signal. This is the reason that each filter wheel sector must remain before the camera lens for a three-frame, instead of a two-frame, time interval.

This effect is readily seen in waveform A for the interval during which the opaque (black) sector is before the camera lens 11 ($t_o$ to $t_o$+3T). As there seen, a one frame time interval elapses before the video signal reaches the proper black level. It is further seen that the second complete frame following $t_o$ will be a true completely black frame. The same consideration applies for the other color intervals, namely, that the second complete video frame following the instant of filter switching will always be a true completely single-color frame. Thus, the second complete frame following filter switching time $t_o$+3T will be a true completely green frame. As is thus seen, every third frame is a true single-color frame. The reason for generating a completely black frame is to provide a synchronizing signal for enabling the subsequent picture-reproducing apparatus to separate out and properly utilize only the true single-color frames.

As indicated in FIG. 4, the picture-reproducing apparatus includes detector means represented by a black frame detector 64 for detecting the occurrence of a black frame in the video signal. This black frame detector 64 includes an amplifier 65 followed by an integrator 66. The output of the integrator 66 is sampled immediately following the end of the active portion (image information portion) of each frame interval by means of a switch circuit 67 which operates momentarily to pass the integrator output signal to a comparator 68. Immediately following each sampling interval, the integrator 66 is discharged or reset to zero, this occurring before the appearance of the image information portion of the following frame.

Sampling pulses and reset pulses for controlling the switch 67 and the integrator 66 are generated by supplying the separated vertical sync pulses (waveform B) appearing at the output of the vertical sync separator 41 to the input of a first one-shot multivibrator 69 which, in turn, drives a second one-shot multivibrator 70. The leading edge of each vertical sync pulse (waveform B) triggers the one-shot multivibrator 69 to produce at the output thereof a short duration sampling pulse (waveform C). The trailing edge of each sampling pulse, in turn, serves to trigger the one-shot multivibrator 70 to produce at the output thereof a short duration reset pulse (waveform D). As seen from FIG. 5, these sampling and reset pulses occur during the vertical sync pulse intervals of the video signal.

The comparator 68 operates to compare each integrator output sample with a reference voltage $V_{ref.}$ to determine whether any significant image information component (component 62 of waveform A) was present during the preceding frame. If any significant image information component was present, then the integrator output sample exceeds the reference voltage and a positive-going pulse (waveform E) appears at the output of the comparator 68. If no significant image component was present during the preceding frame (as is the case for a true completely black frame), the output of the comparator 68 remains at a binary zero level, which may, in fact, be a zero volt level.

The output of the comparator 68 is supplied to the first input of a NOR type binary logic circuit 71. The periodic sampling pulses (waveform C) are supplied to a second input of the NOR circuit 71. The logic of the NOR circuit 71 is that such circuit will produce a binary one level at the output thereof if, and only if, both inputs are simultaneously at a binary zero level. Considering the upper level of the sampling pulse waveform C as being a binary one level and the lower level as being a binary zero level, then it is seen by comparing waveforms C and E that a coincidence of binary zero levels occurs only during those sampling pulse intervals during which the output of comparator 68 remain at the zero level. This occurs only when the sampled output of the integrator 66 indicates the occurrence of a true completely black frame. The output of NOR circuit 71 is represented by waveform F. Such output contains binary one level pulses which occur during the simultaneous occurrence of the two zero level inputs. The pulses of waveform F thus represent black frame indicator pulses.

The color control mechanism portion of FIG. 4 also includes counter circuit means for counting the vertical sync pulses appearing at the output of the vertical sync separator 41 and producing control pulses at a submultiple of the vertical sync rate. This counter circuit means includes a divide-by-three counter 72 having an input coupled to the output of the separator 41 by way of a gate circuit 73. Gate circuit 73 is controlled by a flip-flop circuit 74. When gate circuit 73 is activated by flip-flop 74, the sync pulses pass on through to the counter 72. Such counter 72 operates to produce one output pulse for every three input pulses supplied to the input thereof. Typical ones of these pulses are indicated in waveform G of FIG. 5. Each is of a one-frame duration. The trailing edges of these counter output or control pulses operate to trigger a one-shot multivibrator circuit 75 to cause such circuit to produce a filter advance pulse (waveform H) which is supplied to the solenoid coil 52 of the color-switching mechanism associated with the filter wheel 43. By momentarily lowering the detent stop plate 50, each of the filter advance pulses (waveform H) causes the filter wheel 43 to quickly rotate through an angle of 120°.

There is provided a further divide-by-three counter 76 for counting the filter advance pulses (waveform H) and producing an output pulse each time three such pulses are counted. The output pulses from counter 76 can be termed "end-of-sequence" pulses. Among other things, the occurrence of each such pulse indicates that the color wheel 43 has finished one complete revolution of rotation.

Initially, the flip-flop circuit 74 is set to its "off" condition. This disables the gate circuit 73 so that no pulses can pass therethrough. Initially, the counters 72 and 76 are reset to their zero count conditions. These initial settings are accomplished by momentarily closing a switch 77. This enables a battery 78 (or other suitable voltage source) to supply a reset signal to the "off" terminal of the flip-flop 74 and to the reset terminals of the counters 72 and 76, such reset signal being supplied by way of respective ones of OR circuits 79, 80 and 81.

The black frame indicator pulses at the output of NOR circuit 71 are supplied to the "on" terminal of flip-flop 74 and the reset terminals of counters 72 and 76, the latter two connections being made by way of OR circuits 80 and 81, respectively. The "end-of-sequence" pulses appearing at the output of counter 76 are supplied to the "off" terminal of flip-flop 74 and the reset terminal of the counter 72, these connections being made by way of OR circuits 79 and 80, respectively.

The received video signal (or tape playback thereof) is supplied to the light intensity control electrode of the cathode-ray tube 40 by way of a gate circuit 82. When such gate circuit 82 is activated, it passes the video signal to such control electrode. When such gate circuit 82 is disabled, it clamps the cathode-ray tube control electrode at a black level. Gate circuit 82 is activated by appearance of a control pulse or gating pulse (waveform G) at the output of counter 72.

The black frame indicator pulses at the output of NOR circuit 71 are further supplied to the input of a one-shot multivibrator circuit 83. Each such pulse triggers the one-shot multivibrator 83 and causes it to produce a corresponding output pulse of somewhat longer time duration. These pulses are represented in waveform I and are supplied to the film advancing mechanism in the film camera 55. Each such pulse moves the color-sensitive photographic film from one frame position to the next.

Considering briefly the operation of the picture-reproducing apparatus of FIG. 4, the flip-flop circuit 74 is initially set to its "off" condition and the counters 72 and 76 are initially reset to their zero count conditions by momentarily closing the switch 77. The optical filter wheel 43 is then manipulated to place the filter sector for the first expected color in the color sequence in the optical path between the display screen 44 and the film camera lens 56. For the assumed green, blue, red sequence, the green filter sector is the one initially placed in this position. The apparatus of FIG. 4 is then ready to commence the reproduction of the color images of the televised scene.

Following these initial setup preparations, the picture reproducing apparatus remains idle until the first completely black frame in the video signal is detected. Upon such occurrence, the resulting black frame indicator pulse at the output of NOR circuit 71 advances the color-sensitive photographic film in the camera 55 to the next frame position and turns on the flip-flop circuit 74. The turning on of flip-flop 74 activates the gate 73, which then passes vertical sync pulses to the counter 72. Counter 72 counts these pulses to produce the first control pulse or gating pulse 84 of waveform G. This gating pulse 84 is coincident in time with the true or completely green frame 85 in the video signal of waveform A. This gating pulse 84 activates the gate 82, which then passes the true green frame 85 to the cathode-ray tube 40. This produces a monochrome image on the display screen 44 which represents the green information content of the scene being televised. This display screen image is viewed through the green optical filter sector on the wheel 43 to record a green image on the color film in camera 55.

Following termination of the gating pulse 84, a filter advance pulse (waveform H) is generated by the one-shot multivibrator 75, which filter advance pulse rotates the filter wheel 43 through an angle of 120°. This brings the blue filter sector in front of the display screen 44. The counting of further vertical sync pulses by the counter 72 produces the second gating pulse 86 of waveform G. This activates the gate 82 to pass the true blue frame 87 of the video signal to the cathode ray tube 40 to record a blue image on the color film of camera 55.

Following this, the next occurring filter advance pulse brings the red filter sector into position in front of the display screen 44. The counting of the subsequent sync pulses by the counter 72 produces the third gating pulse 88 which gates the true red frame 89 of the video signal through the gate 82 to the cathode ray tube 40. This records a red image on the color film in camera 55.

Since the film in camera 55 has remained stationary, there is thus recorded a complete color picture on such film. The filter advance pulse following the recording of the red image serves to complete the rotation of the color wheel 43 such that the initial green filter sector is again before the display screen 44. This same filter advance pulse also causes the "end-of-sequence" counter 76 to produce an overflow or output pulse. This "end-of-sequence" output pulse turns "off" the flip-flop 74 which, in turn, disables the gate 73. This stops the counting action and the picture reproducing apparatus remains idle until the occurrence of the next true black frame in the video signal. Upon the occurrence of such next true black frame, the foregoing cycle of operation is again repeated, the film in camera 55 first being advanced to the next frame position by the triggering of one-shot multivibrator 83 by the black frame indicator pulse from NOR circuit 71.

As is seen from the foregoing, the present invention broadly contemplates the provision of a color television system which allows the use of a relatively simple and inexpensive color filter mechanism on a monochrome television camera. Since the color filter mechanism is not synchronized with the camera scanning action, an important feature of the system relates to the manner in which synchronization is established between the receiver image-reproducing apparatus and the television camera doing the broadcasting. As seen from the foregoing, this is accomplished by providing an opaque sector on the color filter mechanism for enabling the television camera to periodically generate a completely black video frame. The receiving equipment is provided with special detector circuitry for detecting the occurrence of such completely black frames in the received video signal and synchronizing therewith the circuits controlling the reproduction of the color images.

As will become more apparent hereinafter, the details of both the television camera equipment and the remote picture reproducing equipment are subject to considerable variation and modification while still realizing the benefits of the present invention. As a first example of such variations, the optical filter wheel in the camera color filter mechanism 12 may be modified to have the construction indicated in FIG. 6. FIG. 6 shows an optical filter wheel 90 having a total of five sectors 90r, 90b, 90g, 90bk and 90w. The sectors 90r, 90b and 90g contain optical filters respectively having red, blue and green color transmission characteristics. Sector 90bk is an opaque sector for producing a black image and the added sector 90w is a colorless transparent sector for enabling the production of a normal black-and-white video signal. The filter wheel 90 is provided with detents 91 spaced at 72° points around the periphery of the wheel 90. For sake of reference, the position of the television camera lens is indicated at 11.

The use of the additional transparent sector 90*w* gives rise to several possibilities. For one thing, the color filter mechanism 12 can now be used so that normally the transparent sector 90*w* is before the camera lens 11. This enables the camera 10 to function in its normal manner to transmit monochrome video signals. Then, when the occasion arises that it is desired to transmit a color picture, drive release mechanism is activated so as to allow one complete revolution of the filter wheel 90 with the wheel stopping with the transparent sector 90*w* again before the lens 11. The wheel 90 then remains stationary until the release mechanism is again operated. This provides a system whereby monochrome video signals are normally transmitted but, upon command, the video signals necessary for producing a complete color image are briefly transmitted. Such a system would be particularly useful aboard an unmanned exploration type spacecraft wherein only occasional color information is needed, the wheel release mechanism being solenoid controlled and actuated by an appropriate radio command signal.

In order to determine when the wheel 90 has made one complete revolution, a further detent 92 is provided on the periphery of such wheel 90, the detent 92 extending parallel to the center axle of the wheel 90. The spring drive release mechanism for the wheel 90 is modified so that activation of such release mechanism starts the stepwise rotation process, such process being terminated when the detent 92 hits an appropriate linkage for returning the release mechanism to its locking position.

Other color sequences can be used for the camera color filter mechanism. For example, a luminance and color difference type of system can be used wherein one sector provides a luminance signal and two additional sectors provide two different color difference signals. Also, the color filter mechanism need not take the form of a wheel. Instead, such mechanism may be in the form of a movable belt having successive sectors of different colors (including a periodic opaque sector).

The present invention can also be used with an interlaced type of television system wherein alternate fields respectively convey the information for the odd numbered and even numbered horizontal lines of the picture. This is accomplished by causing each camera filter wheel sector to remain before the camera lens for one additional vertical scanning interval. In other words, each filter wheel sector would remain before the lens for a length of time equal to approximately 4T instead of 3T.

Considering now some of the possible variations and modifications of the picture-reproducing apparatus shown in FIG. 4, it is first noted that the color image-reproducing mechanism need not take the form of a monochrome cathode-ray tube having a color filter wheel mounted in front thereof. Instead, a three-color type of cathode-ray tube can be used, in which case no color filter wheel is required. Assuming the case of a three-gun shadow-mask type of color picture tube, the incoming video signal would be supplied to the intensity control electrodes of the three guns by way of three individual gate circuits similar to the gate circuit 82 of FIG. 4. The counting circuits would be modified so that the gate for the green gun is activated during the occurrence of the true green video frame, the gate for the blue gun is activated during the occurrence of the true blue frame and the gate for the red gun is activated during the occurrence of the true red frame.

Another possible modification of the FIG. 4 circuitry is that the "end-of-sequence" counter 76 may be omitted, provided that the filter wheel 43 is modified to have the same four-sector construction as the camera filter wheel 18. In this case, the additional pulses indicated in outline form at 93 and 94 would be present in waveforms G and H, respectively, of FIG. 5.

An additional possible modification is that a further indexing mechanism can be added to the filter wheel 43 for enabling the black frame indicator pulse from the detector 64 to automatically reset the wheel 43 so that the desired wheel sector (green) is initially before the display screen 44.

For the assumed NASA frame rate of 0.625 frames per second, the above-described color television system is primarily useful for transmitting still pictures or pictures of scenes having very little significant motion or movement. For the 0.625 frame per second rate, a total time of 19.2 seconds (12T) is required to transmit the data for a single complete color picture. As a consequence, any significant movement in the scene being televised (or of the camera) would cause a blurring effect in the resulting reproduced image.

This limitation can be overcome by increasing the frame rate of the television system. The primary limit on how high the frame rate can be increased is set by the response time of the various mechanical portions of the system. The mechanical limitations in the reproducing equipment can, of course, largely be eliminated by the use of a three-color cathode-ray tube and the consequent elimination of the rotating color filter wheel. With respect to the filter mechanism used with the broadcasting camera, such mechanism can, for example, be modified to permit continuous rotation, as opposed to setwise rotation, of the filter wheel. Thus, if the other requirement of the particular application in which the system is being used permit of it, then the system can be constructed to accommodate reasonable amounts of movement in the televised scene.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What I claim is:

1. A color television system comprising:
- a monochrome television camera for viewing a scene and generating a television signal corresponding thereto;
- optical filter means comprising at least three sectors, two of which have different color transmission characteristics and the third of which is opaque;
- means for moving the filter sectors in front of the lens of the television camera, one at a time, for causing the television camera to generate a video signal having periodic frames individually representing at least a black image, an image in a first color and an image in a second and different color;
- means for transmitting the video signal to a remote location;
- means at such remote location for receiving and recovering the transmitted video signal;
- color image-producing means responsive to the recovered video signal and for producing images in different colors;
- and means responsive to the recovered video signal for detecting the occurrence of a black frame and controlling the image-reproducing means for causing the first-color video frame to produce an image in such first color and for causing the second-color video frame to produce an image in such second color.

2. Apparatus for use with a monochrome television camera for enabling such camera to produce television signals from which may be reproduced a color image comprising:
- optical filter means comprising at least three sectors, two of which have different color transmission characteristics and the third of which is opaque;
- means for mounting the optical filter means in front of the lens of the monochrome television camera whereby the various sectors may move, one at a time, in front of such lens;
- and spring means for driving the optical filter means for causing such movement.

3. Apparatus in accordance with claim 2 wherein the optical filter means comprises at least four sectors, three of which have different color transmission characteristics corresponding to three primary colors and the fourth of which is opaque.

4. Apparatus in accordance with claim 2 wherein the optical filter means comprises five sectors, three of which have different color transmission characteristics corresponding to three primary colors, the fourth of which is opaque and the fifth of which is transparent and colorless.

5. Apparatus in accordance with claim 2 wherein the optical filter means is in the form of a wheel with the filter sectors occupying different sectors of the circle defined by the wheel and wherein the spring means includes an escapement mechanism for causing the optical filter wheel to rotate in a stepwise manner so that each sector is before the camera lens for a predetermined length of time.

6. Apparatus in accordance with claim 5 wherein the escapement mechanism is constructed so that each filter sector remains stationary in front of the camera lens for a length of time approximately equal to three times the vertical frame period of the television camera.

7. Picture-reproducing apparatus for reproducing a color image from a television video signal having periodic frames individually representing at least a black image, an image in a first color and an image in a second and different color comprising:

color image-reproducing means responsive to the video signal for producing images in different colors;

color control means responsive to the video signal for controlling the image-reproducing means for causing a first reproduced image to be in the first color and a second and subsequent reproduced image to be in the second color;

and detector means responsive to the video signal for detecting the occurrence of a black frame and synchronizing the operation of the color control means whereby the first-color reproduced image corresponds to the first-color video frame and the second-color reproduced image corresponds to the second-color video frame.

8. Picture reproducing apparatus in accordance with claim 7 wherein:

the color image-reproducing means includes monochrome cathode-ray tube means for producing monochrome images corresponding to the different color video frames;

the apparatus includes color-sensitive photographic means for recording the images reproduced by the cathode-ray tube means;

the image-reproducing means also includes optical filter means comprising at least two sectors having color transmission characteristics corresponding to the first and second video signal colors;

the image-reproducing means further includes means for mounting the optical filter means intermediate the cathode-ray tube means and the photographic means whereby the different sectors may move, one at a time, into the optical path therebetween;

and the color control means includes means for causing advancement of the sectors of the optical filter means in step with the occurrence of the periodic black and color frames in the video signal.

9. Picture-reproducing apparatus in accordance with claim 7 and further including:

camera means for recording the reproduced images on color-sensitive photographic film;

and means for automatically advancing the photographic film each time a black frame is detected in the video signal.

10. Picture-reproducing apparatus in accordance with claim 7 wherein the color control means includes:

sync separator circuit means responsive to the video signal for producing vertical sync pulses;

counter circuit means for counting the vertical sync pulses and producing control pulses at a submultiple of the vertical sync rate;

and color switching means responsive to these control pulses for changing the color of the image reproduced by the image-reproducing means;

and wherein the detector means generates a black frame indicator pulse which is supplied to the counter circuit means for synchronizing the control pulses with the desired frame intervals in the video signal.

11. Picture-reproducing apparatus in accordance with claim 10 and further including gate circuit means responsive to the control pulses for selectively supplying the video signal to the image-reproducing means.